United States Patent

Merla et al.

[11] Patent Number: 5,575,485
[45] Date of Patent: Nov. 19, 1996

[54] MAGNETIC GASKET SUITABLE FOR FORMING A SEAL BETWEEN A FIXED PART AND AN OPENABLE PART

[75] Inventors: Adriano Merla, Angera; Paolo Cittadini, Luvinate, both of Italy

[73] Assignee: Industrie Ilpea S.p.A., Italy

[21] Appl. No.: 240,660

[22] PCT Filed: Nov. 24, 1992

[86] PCT No.: PCT/EP92/02651

§ 371 Date: May 17, 1994

§ 102(e) Date: May 17, 1994

[87] PCT Pub. No.: WO93/10990

PCT Pub. Date: Jun. 10, 1993

[30] Foreign Application Priority Data

Nov. 25, 1991 [IT] Italy .................. MI91A3137

[51] Int. Cl.⁶ ............................................. F16J 15/53
[52] U.S. Cl. ........................... 277/80; 277/184; 49/478.1; 49/490.1
[58] Field of Search ................... 277/80, 166, 184, 277/209; 49/478.1, 490.1, 498.1; 29/607

[56] References Cited

U.S. PATENT DOCUMENTS

| | | | |
|---|---|---|---|
| 2,188,091 | 1/1940 | Baermann, Jr. | 29/607 |
| 3,125,389 | 3/1964 | Swaneck, Jr. | 49/478.1 |
| 3,159,517 | 12/1964 | Schornstheimer et al. | 49/478.1 |
| 3,191,106 | 6/1965 | Baermann | 29/607 |
| 3,248,159 | 4/1966 | Hall | 49/478.1 |
| 3,710,291 | 1/1973 | Nicoud | 29/607 |
| 5,257,791 | 11/1993 | Cittadini et al. | 277/80 |

FOREIGN PATENT DOCUMENTS

| | | | |
|---|---|---|---|
| 0062153 | 10/1982 | European Pat. Off. . | |
| 0146994 | 7/1985 | European Pat. Off. . | |
| 0155016 | 9/1985 | European Pat. Off. . | |
| 0397300 | 11/1990 | European Pat. Off. . | |
| 0519565A1 | 12/1992 | European Pat. Off. . | |
| 559267 | 9/1993 | European Pat. Off. | 49/478.1 |
| 2846629 | 4/1980 | Germany | 49/478.1 |
| 578165 | 6/1958 | Italy . | |
| 1107502 | 11/1978 | Italy . | |
| 21692 B/83 | 4/1983 | Italy . | |
| 830712 | 3/1960 | United Kingdom | 49/478.1 |
| 835492 | 5/1990 | United Kingdom | 49/478.1 |

*Primary Examiner*—Scott Cummings
*Attorney, Agent, or Firm*—Foley & Lardner

[57] ABSTRACT

This invention relates to a magnetic gasket particularly suitable for forming a seal between a fixed part and an openable part including in regions of curvilinear extension, for example between the body and door of a vehicle, of the type comprising an element for fixing to one of said parts and a seat housing a magnetized bar (11) of substantially rectangular cross-section in which said fixing element and said seat (8) for the magnetized bar are connected together by an extendable deformable tubular chamber, characterised in that said bar (11) is magnetized along at least one of the two shorter opposing sides (19, 19') of its substantially rectangular cross-section, said magnetized side facing when in its operating position the part with which contact is to be made for sealing purposes.

14 Claims, 4 Drawing Sheets

MAGNETIC GASKET SUITABLE FOR FORMING A SEAL BETWEEN A FIXED PART AND AN OPENABLE PART

BACKGROUND

Gaskets for motor vehicles are known, for example from Italian Patent No. 1,017,502 and Italian Utility Model No. 21692 8/83 in the name of the present applicant, which are suitable for forming a seal between the vehicle body and openable parts of the bodywork, such as doors, hatches, hood and the like when these are closed, of the type comprising a deformable profiled strip able to be fixed to the vehicle body by snapping-on, to said profiled strip there being connected along the straight regions of engagement between the vehicle body and the openable part a tubular section divided into a pair of separate adjacent chambers, one of which acts as a bellows air chamber and the other as a seat for magnetized material.

These magnetic gaskets represent considerable progress over compression-operated gaskets without a magnetic seal, in terms both of improved sealing and of lesser pulling action to effect closure.

There is however the technical problem of adapting this type of gasket to the varying range of shapes which the engagement region between the fixed and openable parts can assume, particularly in curvilinear regions, and especially when the radius of curvature is small. In very accentuated curvature regions there are considerable problems relating to deformation and squashing of the magnetic gaskets, which can result in loss of seal, formation of folds and points of discontinuity, or indeed breakage of the gasket after a certain time.

European Patent Application No. 0519565 of the present applicant proposes a gasket able to solve this technical problem. It provides a magnetic gasket for forming a seal between a fixed part and an openable part in regions of curvilinear extension, for example in particular between the body and door of a vehicle, of the type comprising a profiled strip for fixing to said parts and a chamber housing a magnetized bar, in which said profiled fixing strip and said tubular chamber for the magnetized bar are connected together by an extendable deformable tubular chamber the opposing free walls of which are substantially curvilinear and curved in the same direction.

SUMMARY OF THE INVENTION

An object of the present invention is to provide a magnetic gasket ideally suitable for mounting in curvilinear regions even of very small radius of curvature, without the deformation stresses to which it is subjected in any way compromising the seal.

A further object is to provide the gasket with a continuous flexible magnetic bar to enable it to be shaped as a frame weldable at a single point without other weld points being required. This means that the required gasket can avoid the presence of weak points such as the welded ones more easily subjected to a potential loss of seal, infiltration, wear, breakage etc.

Further objects are to provide a gasket which can easily bend along one axis and vary its plane along the other axis, ensures good thermal insulation (and acoustic insulation in the case of motor vehicles), can be easily fitted to the parts, is of the lowest possible weight, and is able to "close" and hence exert magnetic force on possible narrow surfaces (3–5 mm in the case of motor vehicles).

These objects are attained according to the invention by a magnetic gasket particularly suitable for forming a seal between a fixed part and an openable part in regions of curvilinear extension, for example in particular between the body and door of a vehicle, of the type comprising an element for fixing to said parts and a seat housing a magnetized bar of substantially rectangular cross-section in which said fixing element and said seat for the magnetized bar are connected together by an extendable deformable tubular chamber, characterised in that said bar is magnetized along at least one of the two shorter opposing sides of its substantially rectangular cross-section, said magnetized side facing when in its operating position the part with which contact is to be made for sealing purposes.

BRIEF DESCRIPTION OF THE DRAWINGS

The characteristics and advantages of the invention will be more apparent from the description of some non-limiting embodiments thereof, given hereinafter with reference to the figures of the accompanying drawings.

DETAILED DESCRIPTION

Figure 1:
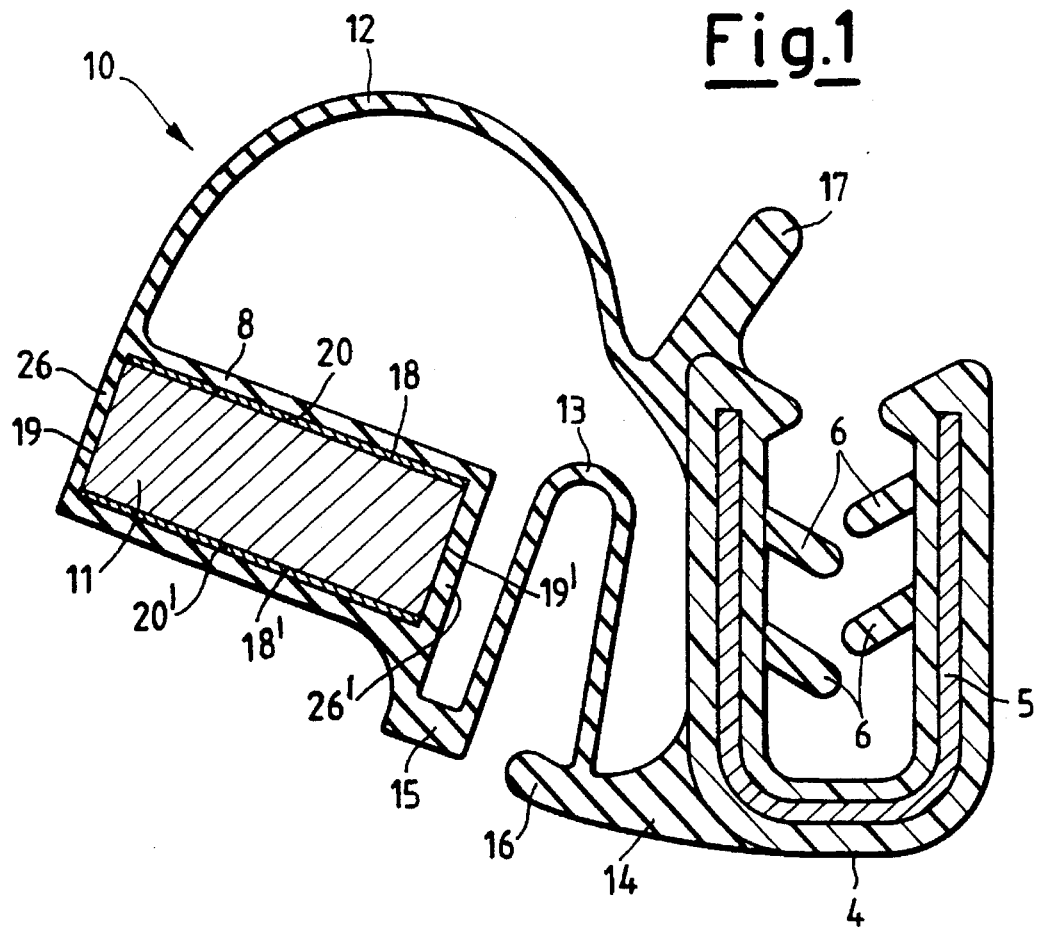
FIG. 1 is a cross-section through a gasket according to the invention.
Figure 2:
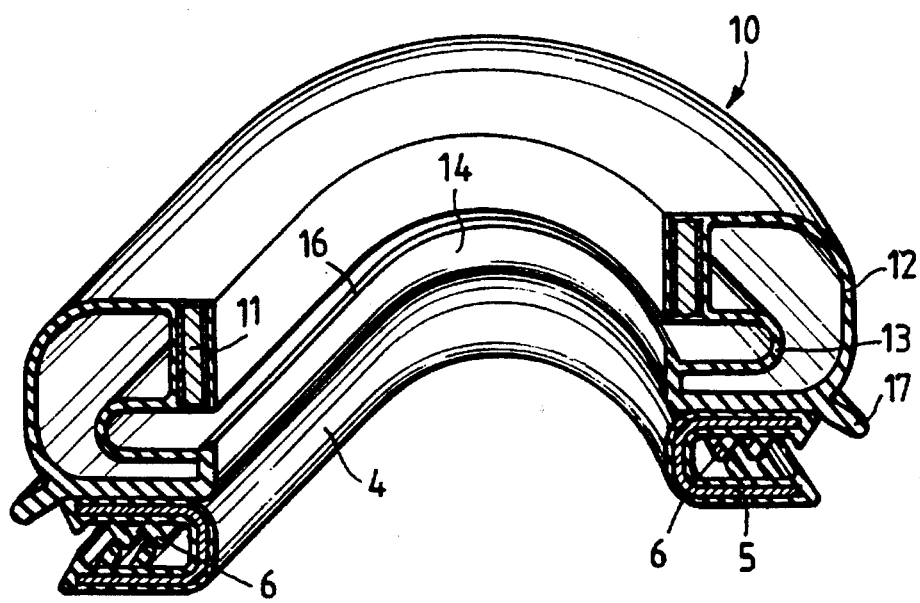
FIG. 2 is a sectional perspective view of a further embodiment of the gasket according to the invention.
Figure 7:
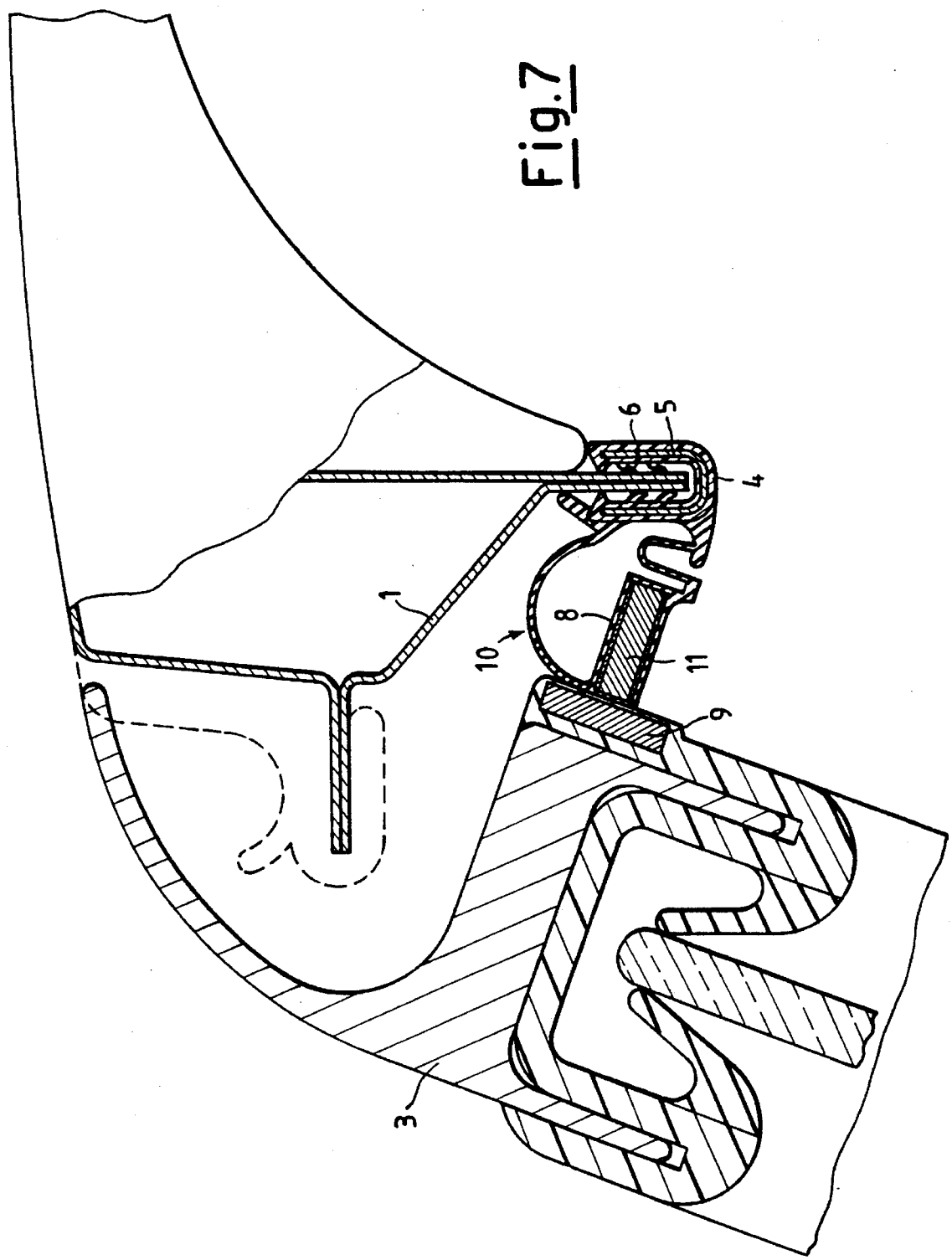
FIG. 7 shows the gasket of FIG. 1 operationally mounted on a motor vehicle.

With reference to the drawings, FIGS. 1, 2 and 7 show a gasket suitable for use on a vehicle, for example for sealing between the vehicle body and openable parts such as doors, boot or hood. With reference to FIG. 7, along a frame 1 of a motor vehicle body cooperating with an access door 3 there is fixed a snap-on fixing element 4 with a metal core 5 and having a C-shaped cross-section. The element 4 is basically a ring fixed along the entire extension of the frame 1, on which it is forced and secured by the pressure exerted by the metal core, adherence being completed by the action of soft saw-tooth projections 6 which act on the surface of the vehicle body frame. Along the angular and curvilinear regions of the frame 1 the element 4 follows the shape because of its capacity to deform and to assume a torus development.

On the opposite side to the snap-on element 4 there extends in the direction of the door 3 a tubular seat 8 for a bar 11 of magnetized material, such as a plastoferrite bar, able to act as a magnetic pole against a counter-pole formed by the door 3 itself if this is of ferromagnetic material, or by a suitable ferromagnetic plate 9 or a magnetic counter-pole located on the door in a position facing the bar 11, if the door is for example of a magnetic material.

The magnetic bar 11 is of rectangular cross-section with opposing pairs of long sides 18, 18' and short sides 19, 19'.

Figure 4:
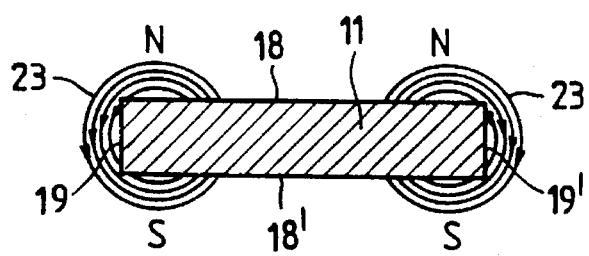

According to the objects of the invention, as will be clarified hereinafter, the magnetic contact with the counter-pole is to be achieved on the short side 19 of the rectangular cross-section, on which the magnetic flux is therefore concentrated as can be seen in FIG. 4.

Consequently the rectangular cross-section of the seat 8 for the magnetic insert has its long sides substantially normal to the surface of the door 3 against which the magnetic bar engages for sealing.

With particular reference to FIGS. 1 and 7, the snap-on element 4 and the seat 8 containing the magnetic bar 11 are connected together by an interposed tubular chamber 10, which is elastically extendable and deformable so that it can act as a bellows to enable the magnetic pole 11 to adapt to the counter-pole 9 in every sealing region. The configuration of the chamber 10 when viewed in cross-section is as follows: the two opposing walls 12 and 13 are of essentially curvilinear and parallel extension, in the sense defined hereinafter. The wall 12 is that which faces the vehicle body frame 1 and is hence that which is on the outside when operationally mounted.

The wall 13 is that which is on the inside when in the operating position. The two walls 12 and 13 are therefore both curved towards the outside of the shape which the gasket assumes within the curvilinear engagement region. The wall 13 is most curvilinear in its central region, whereas in its side portions 14 and 15 connected respectively to the snap-on element and to the magnetic bar it is of rectilinear extension. From the rectilinear portion 14 there extends a rib 16 which acts as a spacer between said two portions.

From the outer wall 12 there extends a corresponding spacer 17 in the direction of the vehicle body frame 1. The bellows chamber 10 both provides thermal and acoustic insulation (in applications in which this is required) and acts as an extendable connection element between the snap-on element and the part against which the seal is to be effected. In this respect, to allow the magnetic bar effecting the seal to undergo the appropriate movements, the chamber preferably has the cross-section shown for example in FIG. 1, in which the inner wall 13 is connected to the short side 19' of the magnetic insert 11 via the base 15 and the vertical wall 26' of the seat 8.

The outer wall 12 of the chamber 10 is connected to the short side 19 of the insert 11 via the opposite vertical wall 26 of the seat 8.

The chamber 10 is hence substantially of C cross-section, even if of suitably irregular shape determined by the specific sealing requirements, which vary from case to case.

For example, in the gasket of FIG. 2, the inner wall 13 of the chamber 10 is connected directly to the respective short side 19' (rather than by way of the base 15 and vertical wall 26' of FIG. 1). In this case the cross-section of 10 assumes the form of a regular C.

The invention also relates to a process for magnetizing a bar, such as said plastoferrite bar, to act as a magnet in the aforesaid gasket, and to the thus magnetized bar.

Figure 3:
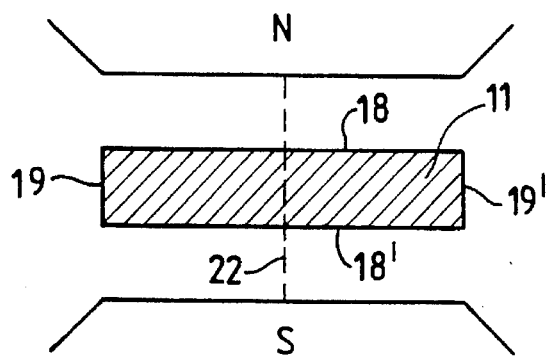
FIGS. 3, 4, 5 and 6 are schematic views relative to the magnetization of a bar suitable for the purposes of the invention.

To magnetize a bar 11 of magnetizable material, such as plastoferrite, along the short sides 19 and 19' of its rectangular cross-section, it is passed through the magnetic field generated by a pair of opposing north (N) and south (S) poles in the position shown in FIG. 3. In this manner, the short sides 19 and 19' of the bar 11 are arranged in a direction parallel to the axis 22 of the N-S magnet. By the effect of this type of magnetization, the bar 11 to act as the insert for the magnet has the lines of force 23 concentrated on said sides, as shown in FIG. 4.

Figure 5:
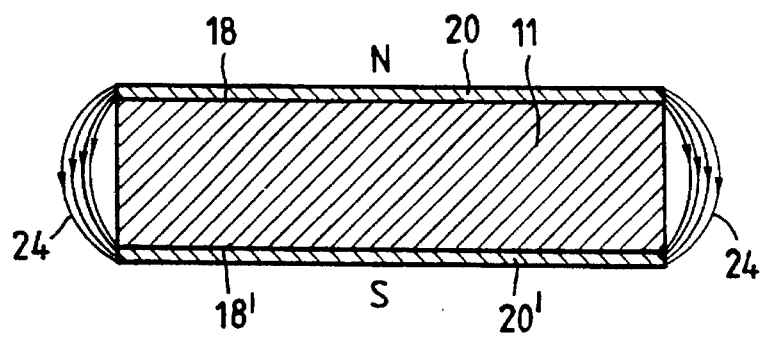
Figure 6:
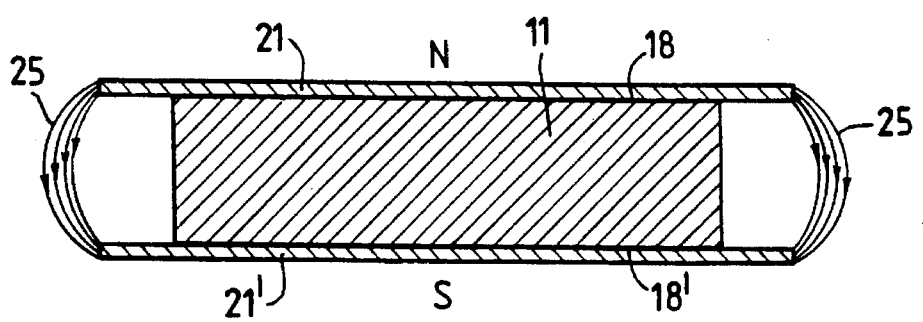

FIGS. 5 and 6 show modifications to the described magnetization process, in which pairs of screening plates 20—20' or 21—21' are positioned along the long sides 18—18' of the bar 11. FIG. 5 shows a pair of plates aligned with the sides 18, 18', so that the lines of polarization force have the pattern indicated by 24. In FIG. 6 the pair of plates 21, 21' is dimensioned to project beyond the sides 18, 18', so that the lines of magnetic polarization force are as indicated by 25.

In both cases, as the polarization is concentrated in the regions involving the lines of force and hence no longer partly dispersed along the long sides of the cross-section, the magnetic attraction force is greater than the case shown in FIG. 4.

FIG. 1 shows the use of a magnetic insert 11 provided with plates 20, 20' in accordance with the magnetization process of FIG. 5. These plates are retained in position by the magnetic attraction force of the insert 11, and have their edges suitably bevelled so that there is no danger of damaging the walls of the seat 8.

In addition, these plates can be suitably slotted to form points for relieving the flexure to which they are subjected when the gasket is not mounted in a single plane but instead on concave or convex surfaces.

In a different embodiment, instead of the screening plates a compound containing ferromagnetic material can be used, to be coextruded with the insert 11 along the surface of the long sides 20, 20'. By this means a coextruded magnetic bar is formed having its central part of a ferrite-containing compound and the lateral surfaces of the sides 20, 20' of a compound containing ferromagnetic material (such as magnetic steel filings) the function of which is equivalent to that of the screening plates. According to the present invention, the bar exhibits its magnetic attraction force along the shorter side. This magnetic attraction along the shorter side of its rectangular cross-section means that the gasket can undergo bending along its axis without problems, even in the case of small radii of curvature. This feature basically enables the magnetic bar to be used in the closure position or the narrow side of the cross-section. The thickness of the magnetic insert on this side can be indicatively 2–4 mm, so that closure can take place against narrow surfaces.

This magnetization differs substantially from that of magnetic gaskets of known type.

In this respect, for these latter an isotropic bar (ie having the ferrite particles dispersed disorderedly within a polymer matrix) is magnetized by 2 or 3 poles along the longer sides of its rectangular cross-section.

The method of the invention used to magnetize the plastoferrite bar to achieve an attraction force concentrated on the short side consists basically of axial magnetization parallel to the surface of contact, achieved by magnetization with opposing N-S poles as shown in FIG. 3, instead of side-by-side poles on one side of the bar.

For equal compounds and magnetization, the attraction force increases with the use of anisotropic magnetic bars, with particles orientated parallel to the lines of flux of the magnetizer. This orientation can be obtained either by treating the compound or by orientation under a magnetic field during extrusion.

By way of example, in the practical application of the present invention the following values can be considered:

The orders of magnitude for a magnetic bar with a cross-section of 9.8 mm×2.9 mm are as follows (attraction force measured on the 2.9 mm side with a magnetic gap of 0.45 mm).

isotropic bar with axial magnetization parallel to the surface of contact 2–10 g/cm isotropic bar with axial magnetization parallel to the surface of contact (with screening plates) 5–20 g/cm anisotropic bar with axial magnetization parallel to the surface of contact 15–30 g/cm anisotropic bar with axial magnetization parallel to the surface of contact (with screening plates) 30–60 g/cm.

To obtain high attraction forces in another manner, composite ferrites with rare earths or other suitable components can be used, however at considerably higher cost.

The attraction force of the magnetic bar has to satisfy determined requirements, bearing in mind the magnetic gap of thermoplastic rubber and remembering that in the case of motor vehicles an appropriate device may be provided to facilitate the opening of the doors.

Having fixed the radius of curvature, the maximum allowable thickness of the bar is calculated. On the basis of the required attraction force the height of the bar is determined and also whether it is necessary to use screening plates. For a low attraction force it may be sufficient for the rectangular magnetic insert, as a borderline case, to be of a shape which is nearly a square. In this regard it is made clear that—according to the purposes of the prevent invention—the term "rectangular cross-section" can also include, as a borderline case, a substantially square cross-section or a cross-section in which the major side is only slightly longer than the minor side.

On a square door of side measuring one meter, using a magnetic insert with an attraction force of 50 g/cm and applying the force at 0.8 m from the hinge there is an opening-resistant couple of 12.5 kg:

$F = 50 \times 100 = 5000$ g/side=5 kg/side $M = 5 \ (1+0.5+0.5) = 10$ kg $F_0 = {}^{10}\!/_{0.8} = 12.5$ kg Although this provides safety against accidental opening of the door during running, it must not create opening problems when at rest. Because of this it may be necessary to provide a special mechanism to facilitate door opening.

In all cases, optimum extendibility is obtained with the gasket of the invention in a direction perpendicular to the surface of contact with the counter-pole. This extendibility enables the gasket to operate correctly at all points, to take up any planarity differences in the surface of contact and to ensure a seal along the entire outline between the fixed part and the openable part.

Figure 8:
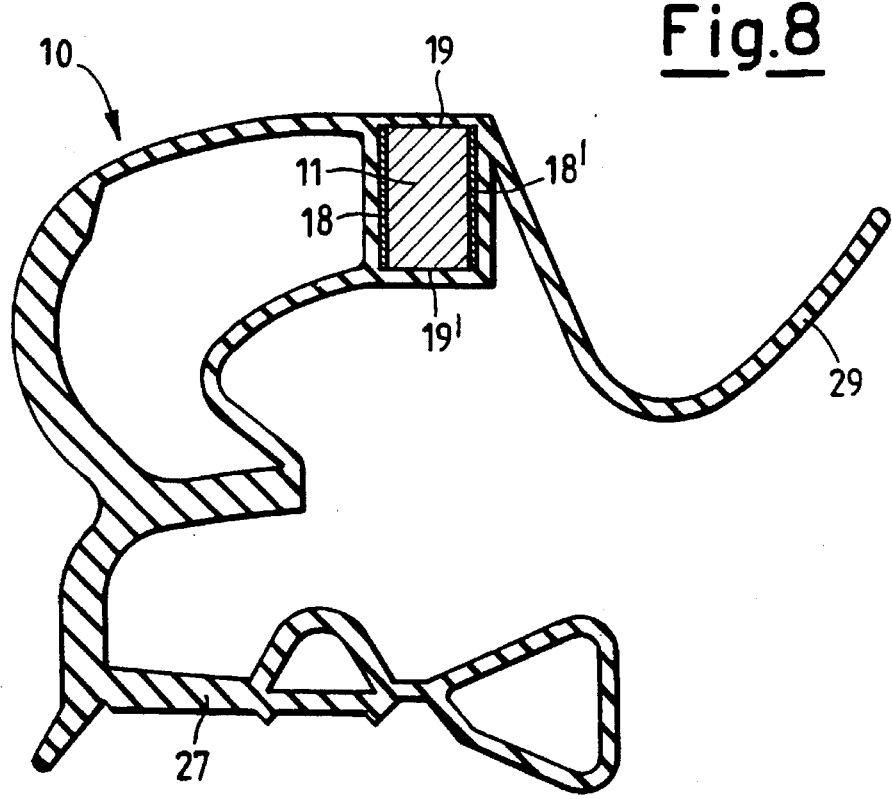
FIGS. 8 and 9 are cross-sections through two further embodiments of the gasket according to the invention.
Figure 9:
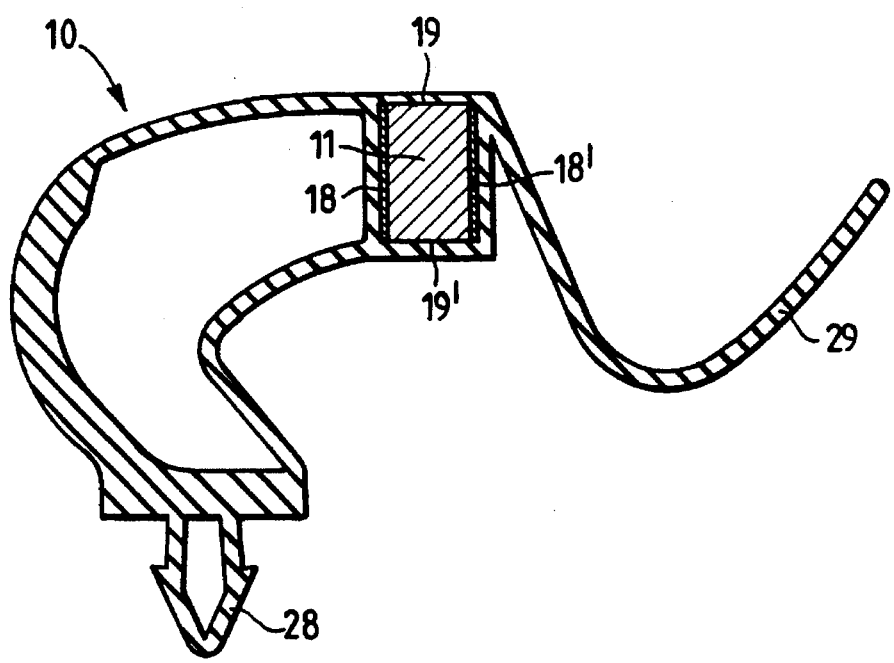

For applications relating to refrigerator, freezer and similar doors and door liners, and to windows, door frames, cabins etc., the gasket can take the form of that shown in FIGS. 8 and 9, which show the cross-section through a monoextruded gasket of soft elastic material such as plasticized PVC, thermoplastic rubber or a traditional vulcanized elastomer housing a magnetic bar 11 according to the invention.

The bar 11 is provided with a pair of short sides 19 and 19' and a pair of long sides 18 and 18'.

The sides on which the lines of flux are concentrated are according to the invention the pair of short sides 19 and 19', of which the side intended to engage the fixed part on closure is the short side 19.

In this case the fixing element is a coupling base 27 in the case of FIG. 8 or a pointed foot 28 for insertion into the recess in the refrigerator door liner or in the door or window frame.

FIG. 8 shows an example of a coextruded gasket in which the coupling foot 27 can consist of a soft or rigid section, with soft material being used for the rest of the gasket. The combination of rigid and soft material can be in the form of known two-hardness vulcanized elastomers, rigid and soft PVC, or coextrudable thermoplastic rubber and rigid material, hence achieving perfect adhesion between rigid and soft materials (such as thermoplastic olefin rubber and polypropylene, ABS and thermoplastic styrene or polyester rubber).

In both the cases shown in FIGS. 8 and 9, the extendable tubular chamber 10 has the characteristic structure described for the preceding examples. The operation of the gasket of the invention is hence essentially as already described.

In FIGS. 8 and 9 the extendable tubular chamber 10 has a lower region of greater thickness connected at a hinge point to an upper region of lesser thickness, to achieve a lateral stability effect as described in European patent 155 016 of the present applicant. In the examples illustrated in FIGS. 8 and 9 there is also provided a rib 29 which seals against the door liner in the case of application to a refrigerator.

In the embodiments of FIGS. 8 and 9, screening plates can also be applied as in the preceding examples to concentrate the magnetic force on the short sides and prevent its partial dispersion along the long sides.

The gasket of the present invention can also be analogously applied to door and window frames, verandas or general closures in the building industry when adaptation to a certain curvature of the closure edge is required, for example in the case of doors or windows which are not perfectly rectangular but instead have a circular upper finish. In these cases the parallel curved-wall shape of the bellows provides the necessary curvature to the extruded section. This concept is applicable for example to the magnetic gaskets described in Italian utility model Nos. 202.759 and 207.429 of the present applicant.

In addition, in the described fields of application the facility for following curvatures gives the stylist considerable freedom in designing the finished object, which would otherwise be dependent upon 90° or other angle welds.

Generally, from the aforegoing it will be apparent that the gasket according to the invention provides in an ideal manner the advantages of being bendable and flexible along any outline shape along which a seal is required, even with small radii of curvature and without undergoing deformation such as to compromise the seal. The continuity of the system formed by the magnetic gasket without any interruption in the corners due to welding is also important according to the present invention, the result being a considerably improved seal against cold and air infiltration. The magnetic gasket according to the invention can undergo numerous modifications with respect to the aforegoing. What is essential is to follow the basic concept of providing a magnetic bar along the sealing region in which that side of the bar which implements the seal is the side represented by the short side of the substantially rectangular cross-section of the bar. With regard to the manufacture of the magnetic gasket according to the invention, the normal methods for this type of gasket can be used. For example, the extendable chamber together with the seat for the magnetic bar and the fixing element, ie the snap-on element in the case of motor vehicles, can be formed together in coextruded material.

Alternatively, the snap-on element can be formed separately and be bonded to the extendable tubular connection chamber during extrusion.

We claim:

1. A magnetic gasket suitable for forming a seal between a fixed part and a moveable part in regions of curvilinear extension of said parts, comprising:

an element for fixing to one of said parts; and a seat housing a magnetized bar of substantially rectangular cross-section, said fixing element and said seat being connected together by an extendable deformable tubular chamber, wherein said bar is magnetized along at least one of two shorter opposing sides of its substantially rectangular cross-section, said magnetized side facing, when in its operating position, the other of said parts with which contact is made for sealing purposes, and wherein said extendable deformable tubular chamber has opposing free walls which are substantially curvilinear and curved in the same direction, thus achieving a substantially C-shaped cross-section.

2. A magnetic gasket as claimed in claim 1, wherein one of said walls of said extendable deformable tubular chamber which, when in its operating position, faces inwards of the curvature of an engagement region between the fixed part and the movable part is essentially curved in a central part thereof, lateral portions thereof being of rectilinear extension.

3. A magnetic gasket as claimed in claim 1, characterised wherein said seat for the magnetic bar is formed within said C-shaped cross-section of the extendable tubular chamber.

4. A magnetic gasket as claimed in claim 1, characterised wherein said seat for the magnetic bar is formed outside said C-shaped cross-section of the extendable tubular chamber.

5. A magnetic gasket as claimed in claim 2, wherein said seat for the magnetic bar is formed along one of said lateral portions of rectilinear extension of said one wall of the extendable tubular chamber which faces inwards of the curvature.

6. A magnetic gasket as claimed in claim 1, wherein at least said wall of said extendable chamber which faces the fixed part, is provided with a spacer.

7. A magnetic gasket as claimed in claim 1, wherein said fixing element, said chamber for the magnetic bar and said extendable chamber are separate parts, and are joined together by a suitable means.

8. A magnetic gasket as claimed in claim 1, wherein said fixing element, a chamber for the magnetic bar and said extendable deformable tubular chamber are made in one piece by one of molding and co-extrusion.

9. A magnetic gasket as claimed in claim 1, wherein a screening layer for the magnetic force is applied along at least one of the longer sides of the substantially rectangular cross-section of the magnetized bar.

10. A magnetic gasket as claimed in claim 9, wherein said at least one screening layer comprises metal plate.

11. A magnetic gasket as claimed in claim 9, wherein said at least one screening layer comprises ferromagnetic material coextruded with said bar.

12. A magnetic gasket as claimed in claim 1, wherein in the substantially rectangular cross-section of said magnetized bar, the length of one pair of opposing sides is slightly greater than the length of the other pair of sides.

13. A vehicle comprising:

a magnetic gasket suitable for forming a seal between a fixed part and a moveable part in regions of curvilinear extension, of said parts, said magnetic gasket including:

an element for fixing to one of said parts; and a seat housing a magnetized bar of substantially rectangular cross-section, said fixing element and said seat being connected together by an extendable deformable tubular chamber, wherein said bar is magnetized along at least one of two shorter opposing sides of its substantially rectangular cross-section, said magnetized side facing, when in its operating position, the other of said parts with which contact is made for sealing purposes, and wherein said extendable deformable tubular chamber has opposing free walls which are substantially curvilinear and curved in the same direction, thus achieving a substantially C-shaped cross-section.

14. A magnetic gasket suitable for forming a seal between a fixed part and a moveable part in regions of curvilinear extension of said parts, comprising:

an element for fixing to one of said parts; and a seat housing a magnetized bar of substantially rectangular cross-section, said fixing element and said seat being connected together by an extendable deformable tubular chamber, wherein said bar is magnetized along at least one of two shorter opposing sides of its substantially rectangular cross-section, said magnetized side facing, when in its operating position, the other of said parts with which contact is made for sealing purposes, wherein said extendable deformable tubular chamber has opposing free walls which are substantially curvilinear and curved in the same direction, thus achieving a substantially C-shaped cross-section, wherein one of said walls of said extendable deformable tubular chamber which, when in its operating position, faces inwards of the curvature of an engagement region between the fixed part and the movable part is essentially curved in a central part thereof, lateral portions thereof being of rectilinear extension, and wherein a spacer extends from at least one of said lateral portions towards the other.

* * * * *